United States Patent
Morimoto et al.

(10) Patent No.: US 9,099,800 B2
(45) Date of Patent: Aug. 4, 2015

(54) CONNECTOR (71) Applicant: NSK Ltd., Shinagawa-ku, Tokyo (JP)

(72) Inventors: Masakazu Morimoto, Tokyo (JP); Tadayoshi Osakabe, Tokyo (JP); Osamu Miyoshi, Tokyo (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/395,088

(22) PCT Filed: Oct. 24, 2013

(86) PCT No.: PCT/JP2013/006320
§ 371 (c)(1),
(2) Date: Oct. 17, 2014

(87) PCT Pub. No.: WO2014/073178
PCT Pub. Date: May 15, 2014

(65) Prior Publication Data
US 2015/0111435 A1   Apr. 23, 2015

(30) Foreign Application Priority Data

Nov. 9, 2012   (JP) ................. 2012-247445

(51) Int. Cl.
*H01R 13/40* (2006.01)
*H01R 13/405* (2006.01)
*H01R 13/04* (2006.01)
(Continued)

(52) U.S. Cl.
CPC .............. *H01R 13/40* (2013.01); *H01R 13/04* (2013.01); *H01R 13/405* (2013.01); *H01R 24/66* (2013.01); *B60L 11/18* (2013.01); *H01R 13/521* (2013.01); *H01R 2201/26* (2013.01)

(58) Field of Classification Search
USPC .................... 439/76.1, 76.2, 474, 521, 733.1; 361/704, 715, 752
See application file for complete search history.

(56) References Cited

U.S. PATENT DOCUMENTS

| | | | |
|---|---|---|---|
| 5,438,160 A | * | 8/1995 | Batty ............................ 174/360 |
| 6,195,263 B1 | * | 2/2001 | Aoike et al. .................. 361/752 |

(Continued)

FOREIGN PATENT DOCUMENTS

| | | |
|---|---|---|
| JP | 8-321342 A | 12/1996 |
| JP | 10-134867 A | 5/1998 |

(Continued)

OTHER PUBLICATIONS

International Search Report (PCT/ISA/210) dated Jan. 28, 2014 with English translation (five pages).

(Continued)

*Primary Examiner* — Alexander Gilman
(74) *Attorney, Agent, or Firm* — Crowell & Moring LLP (57) ABSTRACT

There is provided a connector capable of realizing simple assembly and prevention of entering of foreign matter. A connector terminal (56) includes an insertion part (56a) that has a terminal metal fitting to be electrically connected with an external connection terminal, and a pin (56d) fixed to the insertion part (56a) and has a bent shape. The connector terminal (56) is held by a connector housing (55). In this situation, the connector housing (55) has a hole (57) that has a size at which the pin (56a) can penetrate from a tip side, and a guide wall (57d) formed along an outer circumference of the hole (57) and projects in a direction in which the pin (56d) projects from the connector housing (55).

6 Claims, 7 Drawing Sheets (51) Int. Cl.
*H01R 24/66* (2011.01)
*B60L 11/18* (2006.01)
*H01R 13/52* (2006.01)

(56) References Cited

U.S. PATENT DOCUMENTS

| | | | | |
|---|---|---|---|---|
| 6,434,013 | B2* | 8/2002 | Kitamura et al. | 361/752 |
| 6,442,027 | B2* | 8/2002 | Sanada et al. | 361/704 |
| 6,997,737 | B2* | 2/2006 | Hiwatashi | 439/474 |
| 7,147,485 | B2* | 12/2006 | Ohta et al. | 439/76.1 |
| 7,151,674 | B2* | 12/2006 | Sasaki et al. | 361/752 |
| 7,413,445 | B2* | 8/2008 | Inagaki et al. | 439/76.1 |
| 7,417,873 | B2* | 8/2008 | Kadoya et al. | 361/797 |
| 7,419,385 | B2* | 9/2008 | Itou et al. | 439/76.1 |
| 7,524,206 | B2* | 4/2009 | Gutierrez et al. | 439/607.01 |
| 7,791,888 | B2* | 9/2010 | Tominaga et al. | 361/708 |
| 8,011,976 | B2* | 9/2011 | Ooki | 439/736 |
| 8,023,273 | B2* | 9/2011 | Chlumsky et al. | 361/752 |
| 8,038,914 | B2* | 10/2011 | Suzuki et al. | 264/46.4 |
| 8,337,237 | B2* | 12/2012 | Masuda et al. | 439/374 |
| 8,441,800 | B2* | 5/2013 | Sasaki et al. | 361/752 |
| 8,545,238 | B2* | 10/2013 | Takeda et al. | 439/76.1 |
| 8,904,633 | B2* | 12/2014 | Blossfeld et al. | 29/884 |
| 2006/0292904 | A1* | 12/2006 | Kanou | 439/76.2 |
| 2007/0072452 | A1 | 3/2007 | Inagaki et al. | |
| 2009/0258521 | A1 | 10/2009 | Ooki | |
| 2010/0255732 | A1* | 10/2010 | Kohmura et al. | 439/733.1 |

FOREIGN PATENT DOCUMENTS

| | | |
|---|---|---|
| JP | 2006-140113 A | 6/2006 |
| JP | 2007-87850 A | 4/2007 |
| JP | 2009-140840 A | 6/2009 |
| JP | 2009-252712 A | 10/2009 |
| JP | 2012-134007 A | 7/2012 |

OTHER PUBLICATIONS

Japanese-language Written Opinion (PCT/ISA/237) dated Jan. 28, 2014 with English translation (eight pages).

* cited by examiner

CONNECTOR

TECHNICAL FIELD

The present invention relates to a connector assembled by press-fitting a connector terminal into a connector housing.

BACKGROUND ART

The technique disclosed in PTL 1 is described, for example, as a connector of the related art. The purpose of this technique is to prevent dew condensation around a terminal of a connector, so a wall that blocks a gap part created when a connector housing is mounted on a substrate is formed in the connector housing. In such a situation, the wall is partially arranged (i.e., discontinuously on a connector outer circumference).

In addition, the technique disclosed in PTL 2 is described, as another example. In this technique, a terminal is press-fit into a connector housing, so that a projection that prevents molding material leakage from the interior is fit into the connector housing for providing a creepage distance. In such a situation, the wedge-shaped projection is disposed midway on the terminal, and the projection and a concave part disposed in the connector housing are fit into each other.

CITATION LIST

Patent Literatures

PTL 1: JP 2006-140113 A
PTL 2: JP 2012-134007 A

SUMMARY OF INVENTION

Technical Problem

It is to be noted that for the purpose of reducing a stress or the like on the substrate or a soldering part caused by thermal contraction or thermal expansion, in some cases, the bending process is performed on a leg part (pin) of the connector to be soldered onto the substrate. In a case where the terminal is assembled with the connector housing, it is considered to employ the outsert molding, which is a simple assembly method, because the insert molding is costly. However, in this case, an opening part which is large enough for the pin on which the bending process is performed to penetrate through has to be disposed in the connector housing so that the terminal having the pin on which the bending process is performed in advance is press-fit into the connector housing from a usual connector insertion direction.

When the opening part is large as described above, however, a gap is formed between the pin and the opening part after the terminal is assembled, and entering of foreign matters likely occurs from a connector insertion port side of the connector housing toward the substrate.

In the technique disclosed in PTL 1, while moisture entering is prevented by the wall arranged in the connector housing, the terminal is not press-fit into the connector housing and the terminal on which the bending process is performed is not assumed. Hence, it is impossible to prevent any foreign matter from entering from the opening part of the terminal.

Further, in the technique disclosed in PTL 2, although the terminal is press-fit into the connector housing, the terminal on which the bending process is performed is not assumed. Hence, it is impossible to prevent the above-described entering of foreign matter.

Therefore, an object of the present invention is to provide a connector capable of realizing simple assembly and prevention of entering of foreign matter.

Solution to Problem

In order to solve the above-described problems, according to an aspect of the present invention, there is provided A connector comprising: a connector terminal provided with an insertion part that includes a terminal metal fitting to be electrically connected with an external connection terminal, and a connector terminal with one end fixed to an end part of the insertion part and the other end connected to a substrate, the connector terminal including a lead part which has a bent shape; and a connector housing holding the connector terminal, wherein the connector housing includes a through-hole that has a size at which the through-hole can penetrate through the lead part from the other end side of the lead part, and a guide wall formed along an outer circumference of the through-hole and projects in a direction in which the lead part projects from the connector housing.

In other words, the connector housing has a closed structure that blocks a gap from the insertion part side toward the lead part side through the through-hole when the lead part penetrates through the through-hole from the other end side to hold the connector terminal.

In this manner, the lead part soldered on the substrate has a bent shape, and thus it is possible to reduce a stress on the substrate and a soldering part caused by thermal contraction and thermal expansion. In addition, when the connector terminal is assembled with the connector housing, it is possible to insert the connector terminal into the connector housing in an insertion direction of a mating connector and hold the connector terminal with the lead part being a tip side. As such, it is possible to prevent terminal disconnection caused by a load during the insertion of the mating connector and the load on the substrate where the lead part is connected.

In addition, the lead part is bent in advance and is capable of being outserted to the connector housing, and thus it is possible to prevent the stress on the connector housing as in a case where bending process is performed on the lead part after outsert molding and it is possible to suppress crack generation in the connector. Further, it is possible to improve positional accuracy at a lead part tip.

Further, since the guide wall is disposed, it is possible to protect the lead part that projects from the connector housing. Accordingly, it is possible to achieve a reinforcement with respect to a bending load input with respect to the lead part and it is possible to prevent the lead part from falling. Furthermore, since a clearance between the guide wall and the lead part is set to a minimum, it is possible to close the through-hole with the guide wall and the lead part. As such, it is possible to prevent entering of foreign matter from the connector side toward the substrate.

In addition, in the above-described connector, the guide wall may have a height at least equal to a height from the outer circumference of the through-hole to a bent point of the lead part in a state where the connector housing holds the connector terminal.

In this manner, it is possible to close the through-hole of the lead part with reliability by using the guide wall, and it is possible to appropriately prevent the entering of foreign matter from the connector side toward the substrate.

Further, in the above-described connector, wherein the connector housing includes a press-fit hole into which the connector terminal may be press-fit, and wherein the insertion part may include a press-fit part to be press-fit into the press-fit hole at an end part on a fixed side of the lead part.

In this manner, it is possible to assemble the connector by merely press-fitting the connector terminal, and it is possible to reduce costs through simple assembly.

Additionally, in the above-described connector, the press-fit part may include a small projection that projects laterally from a side edge part of the insertion part.

In this manner, it is possible to allow the projection to be inserted into an inner wall of the press-fit hole when the connector terminal is press-fit into the connector housing, and it is possible to achieve a sufficient holding force. Accordingly, it is possible to achieve a structure in which the connector terminal is unlikely to be disconnected from the connector housing.

Furthermore, in the above-described connector, the insertion part may include a stopper disposed on a side opposite to a fixed point of the lead part to be adjacent to the press-fit part and projects laterally from the outer circumference of the press-fit hole.

In this manner, it is possible to position the connector terminal in the press-fit direction by using the stopper when the insertion part is press-fit into the press-fit hole formed in the connector housing, and it is possible to prevent the connector terminal from transmitting the load directly toward the substrate when an insertion weight of the mating connector and a pushing force (external force) toward the connector terminal is given.

In addition, in the above-described connector, the terminal metal fitting may be a flat-shaped power supply connection terminal.

Further, in the above-described connector, the lead part may have two bent points, the lead part has two bent points, in which a tip part of the lead part conforms to an insertion direction of the connector terminal toward the connector housing in a state of holding by the connector housing, and the tip part of the lead part has a substantially letter Z shape extending to an offset position on a center side of the connector housing with respect to the fixed point to the insertion part.

In this manner, it is possible to position a tip position of the lead part on the center side of the connector housing, and thus it is possible to allow a part of the connector attached to the substrate to be compact.

Advantageous Effects of Invention

With the connector of the present invention, it is possible to simplify the assembling of the connector terminal into the connector housing, protect the lead part projecting from the connector housing, and realize the prevention of entering of the foreign matter from the connector side into the ECU.

DESCRIPTION OF EMBODIMENTS

Embodiments of the present invention will now be described with reference to the drawings.

Figure 1:
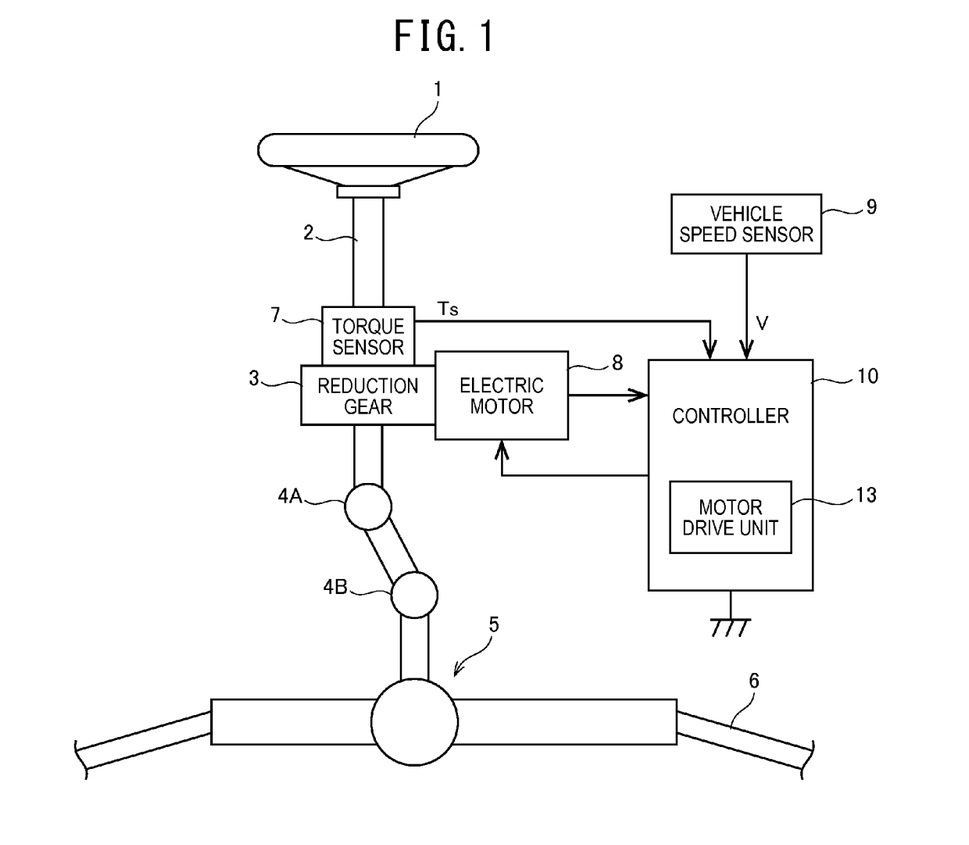
FIG. 1 is a diagram illustrating a basic structure of an electric power steering device in which a semiconductor module according to the present invention is used.

FIG. 1 is a diagram illustrating a basic structure of an electric power steering device in which a connector according to the present invention is used.

In the electric power steering device of FIG. 1, a column shaft 2 of a steering wheel 1 is connected to a tight rod 6 of a steering wheel through a reduction gear 3, universal joints 4A and 4B, and a rack and pinion mechanism 5. A torque sensor 7 that detects a steering torque of the steering wheel 1 is disposed in the column shaft 2, and an electric motor 8 that assists a steering force of the steering wheel 1 is connected to the column shaft 2 via the reduction gear 3. Power is supplied from a battery (not illustrated) to a controller 10 that controls the electric power steering device, and an ignition key signal IGN (refer to FIG. 2) is input to the controller 10 through an ignition key (not illustrated). The controller 10 performs computation of a steering assist command value that is an assist (steering assist) command based on a steering torque Ts detected by the torque sensor 7 and a vehicle speed V detected by a vehicle speed sensor 9, and controls a current supplied to the electric motor 8 based on the steering assist command value computed.

Figure 2:
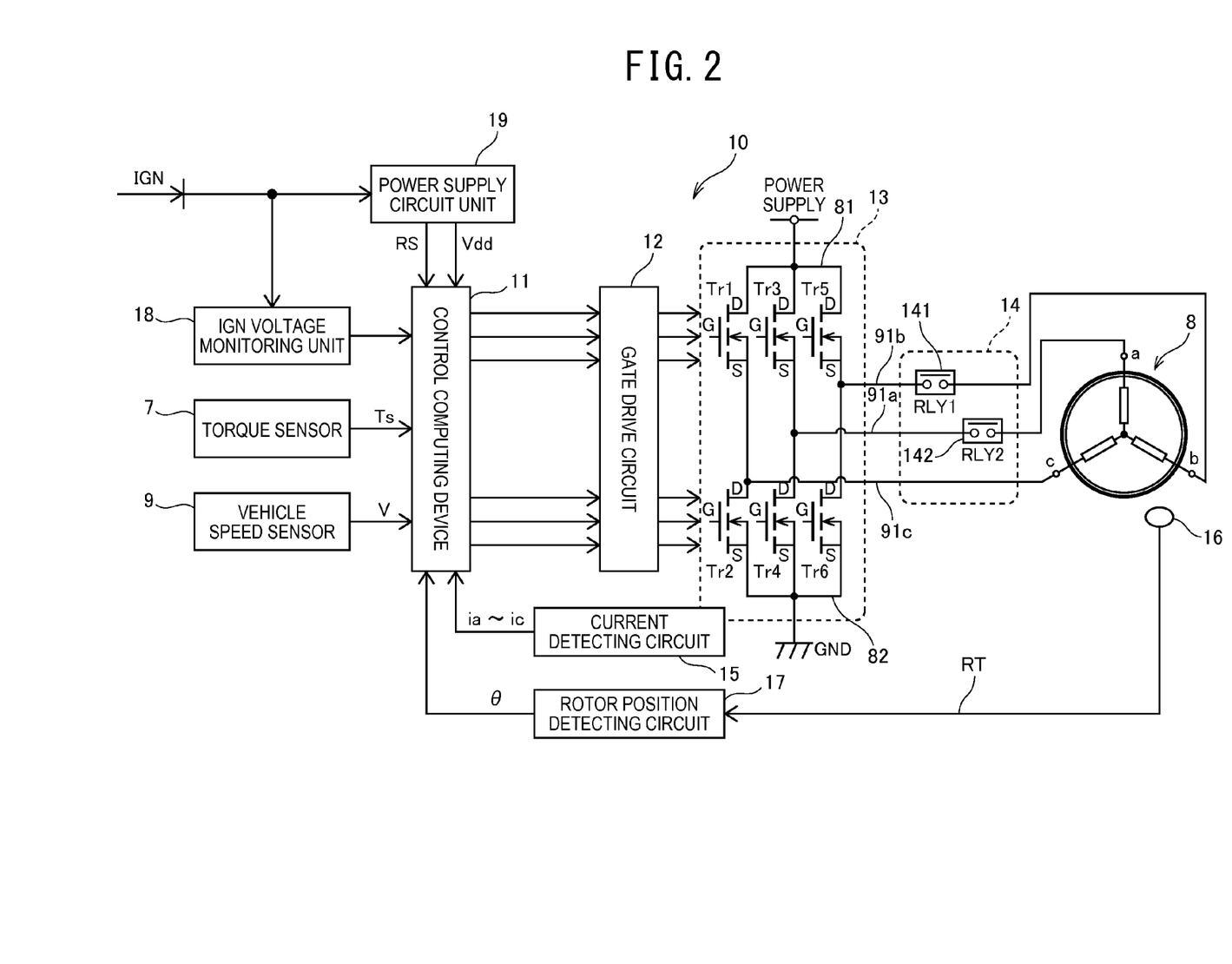
FIG. 2 is a block diagram illustrating a control system of a controller.

The controller 10 is mainly configured with a microcomputer, but the mechanism and configuration of a control device of the controller 10 is illustrated in FIG. 2.

The steering torque Ts detected by the torque sensor 7 and the vehicle speed V detected by the vehicle speed sensor 9 are input to a control computing device 11 as a control computing unit, and a current command value computed by the control computing device 11 is input to a gate drive circuit 12. A gate drive signal formed based on the current command value or the like in the gate drive circuit 12 is input to a motor drive unit 13 having a bridge configuration of an FET, and the motor drive unit 13 drives the electric motor 8 configured with a three-phase brushless motor through a breaker device 14 for emergency stop. A current of each phase of the three-phase brushless motor is detected by a current detecting circuit 15, and three-phase motor currents is to is that are detected are input to the control computing device 11 as feedback currents. Additionally, a rotation sensor 16 such as a Hall sensor is attached to the three-phase brushless motor, a rotation signal RT from the rotation sensor 16 is input to a rotor position detecting circuit 17, and a rotation position θ detected is input to the control computing device 11.

Further, the ignition signal IGN from the ignition key is input to an ignition voltage monitoring unit 18 and a power supply circuit unit 19, a power supply voltage Vdd is input to the control computing device 11 from the power supply circuit unit 19, and a device stop reset signal RS is input to the control computing device 11. Further, the breaker device 14 is configured to have relay contacts 421 and 422 that shut off two phases.

Moreover, describing a circuit configuration of the motor drive unit 13, FET Tr1 and Tr2 connected in series, FET Tr3 and Tr4 connected in series, and FET Tr5 and Tr6 connected in series are connected in parallel with a power supply line 81. In addition, FETTr1 and Tr2, FETTr3 and Tr4, and FETTr5 and Tr6 that are connected in parallel with the power supply line 81 are connected to a ground line 82. An inverter is configured in this manner. Herein, in the FETTr1 and FETTr2, a source electrode S of the FETTr1 and a drain electrode D of the FETTr2 are connected in series to form a c-phase arm of the three-phase motor, and the current is output by a c-phase output line 91c. Additionally, in the FETTr3 and FETTr4, a source electrode S of the FETTr3 and a drain electrode D of the FETTr4 are connected in series to form an a-phase arm of the three-phase motor, and the current is output by an a-phase output line 91a. Further, in the FETTr5 and FETTr6, a source electrode S of the FETTr5 and a drain electrode D of the FETTr6 are connected in series to form a b-phase arm of the three-phase motor, and the current is output by a b-phase output line 91b.

Figure 3:
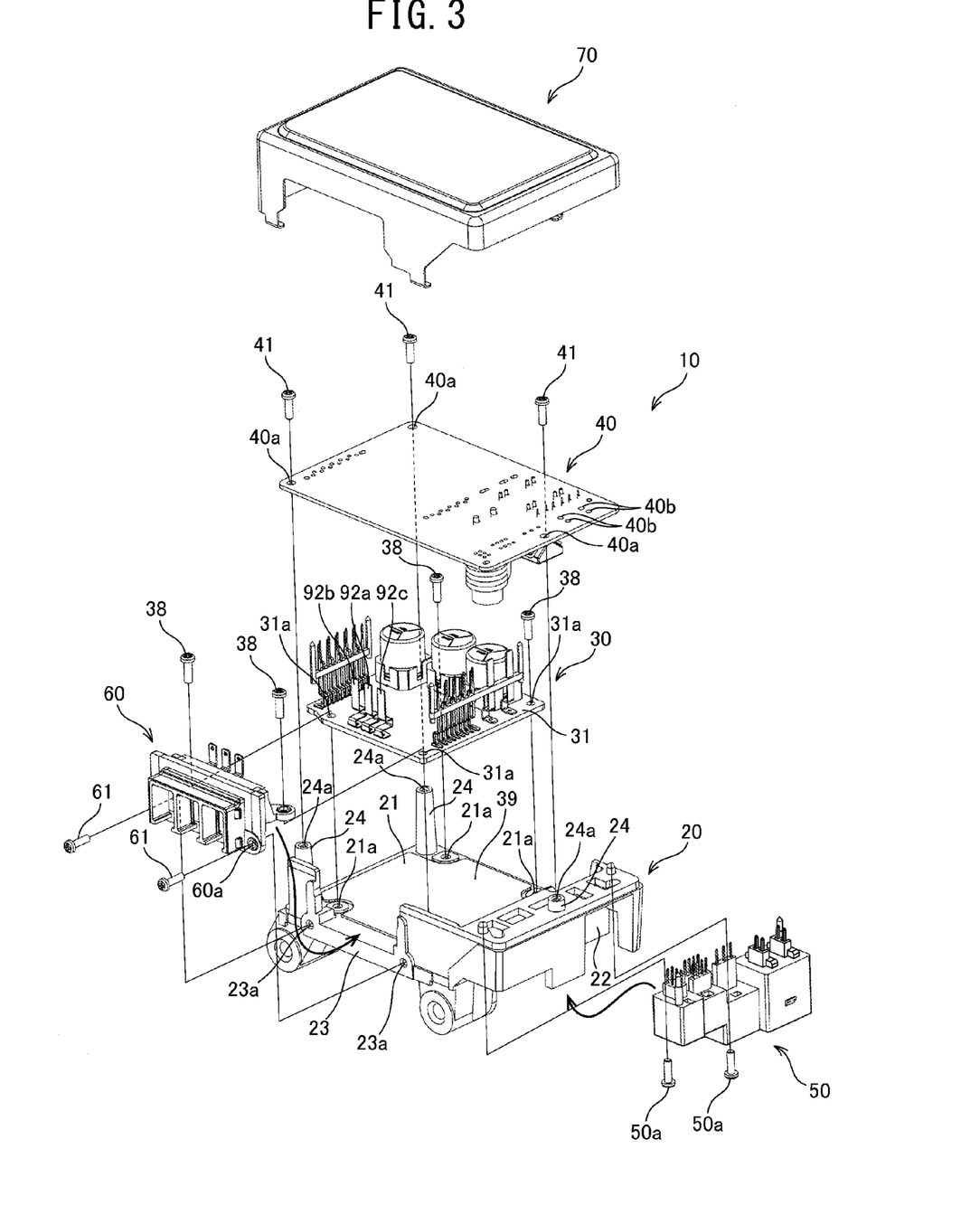
FIG. 3 is an exploded perspective diagram of the controller that has the semiconductor module.

FIG. 3 is an exploded perspective diagram of the controller 10 of the electric power steering device illustrated in FIG. 1. The controller 10 includes a case 20, a semiconductor module 30 as a power module that has the motor drive unit 13, a heat-dissipating sheet 39, a control circuit substrate 40 that has the control computing device 11 and the gate drive circuit 12, a power and signal connector 50, a three-phase output connector 60, and a cover 70.

Herein, the case 20 has a flat-shaped semiconductor module mounting part 21 formed into a substantially rectangular shape to mount the semiconductor module 30, a power and signal connector mounting part 22 disposed in a longitudinal-direction end part of the semiconductor module mounting part 21 to mount the power and signal connector 50, and a three-phase output connector mounting part 23 disposed in a width-direction end part of the semiconductor module mounting part 21 to mount the three-phase output connector 60.

In addition, plural screw holes 21a are formed in the semiconductor module mounting part 21 so that attachment screws 38 with which the semiconductor module 30 is attached are screwed thereinto. Further, plural attachment posts 24 with which the control circuit substrate 40 are attached stand up on the semiconductor module mounting part 21 and the power and signal connector mounting part 22, and screw holes 24a into which attachment screws 41 with which the control circuit substrate 40 is attached are respectively screwed are formed in the respective attachment posts 24. Further, plural screw holes 23a into which attachment screws 61 for attaching of the three-phase output connector 60 are respectively screwed are formed in the three-phase output connector mounting part 23.

Then, the semiconductor module 30 is attached onto the semiconductor module mounting part 21 of the case 20 by use of the plural attachment screws 38. Plural through-holes 31a into which the attachment screws 38 are respectively inserted are formed in a substrate 31 of the semiconductor module 30.

Further, when the semiconductor module 30 is attached onto the semiconductor module mounting part 21, the heat-dissipating sheet 39 is mounted on the semiconductor module mounting part 21, and the semiconductor module 30 is attached onto the top of the heat-dissipating sheet 39. The heat-dissipating sheet 39 causes heat generated in the semiconductor module 30 to be dissipated to the case 20 via the heat-dissipating sheet 39.

Further, the control circuit substrate 40 forms a control circuit that has the control computing device 11 and the gate drive circuit 12 by mounting plural electronic components on the substrate. The control circuit substrate 40 is attached onto the plural attachment posts 24 standing up on the semiconductor module mounting part 21 and the power and signal connector mounting part 22 above the semiconductor module 30 by use of the plural attachment screws 41 after attaching the semiconductor module 30 on the semiconductor module mounting part 21. Plural through-holes 40a into which the attachment screws 41 are respectively inserted are formed in the control circuit substrate 40.

Furthermore, the power and signal connector 50 is used to input the direct current power from the battery (not illustrated) to the semiconductor module 30 and to input various signals including signals from the torque sensor 7 and the vehicle speed sensor 9 to the control circuit substrate 40. The power and signal connector 50 is attached onto the power and signal connector mounting part 22 disposed in the semiconductor module mounting part 21 by use of plural attachment screws 50a.

Then, the three-phase output connector 60 is used to output the currents from an a-phase output terminal 92a, a b-phase output terminal 92b, and a c-phase output terminal 92c. The three-phase output connector 60 is attached onto the three-phase output connector mounting part 23 provided at an end part in the width direction of the semiconductor module mounting part 21 by use of the plural attachment screws 61. Plural through-holes 60a into which the attachment screws 61 are respectively inserted are formed in the three-phase output connector 60.

Further, the cover 70 is attached in such a manner as to cover the control circuit substrate 40 above the control circuit substrate 40 onto the case 20 where the semiconductor module 30, the control circuit substrate 40, the power and signal connector 50, and the three-phase output connector 60 are attached.

Next, a configuration of the connector 50 will be described in detail.

Figure 4:
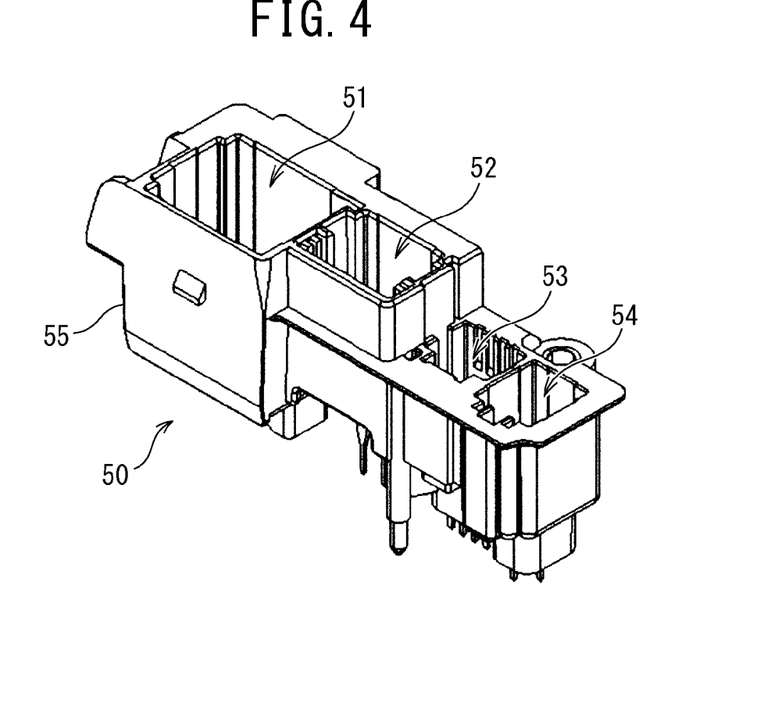
FIG. 4 is a diagram of a connector viewed from an insertion port side.

FIG. 4 is a diagram of the connector 50 viewed from an insertion port side (i.e., lower side in FIG. 3) of a mating connector. As illustrated in FIG. 4, the connector 50 is configured with a power supply connector unit 51, a communication connector unit 52, a torque signal connector unit 53, and a resolver signal connector unit 54, and the respective connector units have a common connector housing 55. The connector housing 55 is integrally molded with a synthetic resin.

A power supply connector that supplies the power of the controller (ECU) 10 is inserted into the power supply connector unit 51, and a vehicle communication signal connector that performs CAN communication is inserted into the communication connector unit 52. In addition, a torque signal connector that inputs the steering torque Ts from the torque sensor 7 is inserted into the torque signal connector unit 53, and a resolver signal connector that inputs the rotation signal RT from the rotation sensor 16 is inserted into the resolver signal connector unit 54.

A connector terminal of each of the connector units is held by the connector housing 55. The following description will focus on the power supply connector unit 51 and a specific configuration thereof will be described in detail.

Figure 5:
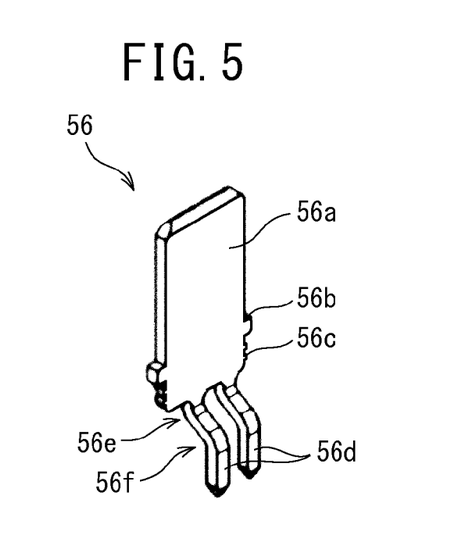
FIG. 5 is a diagram illustrating a shape of a connector terminal.

FIG. 5 is a diagram illustrating a power supply connector terminal 56 (hereinafter, simply referred to as terminal 56) held by the connector housing 55. In this embodiment, an upward direction in FIG. 5 is referred to as an upward direction of the terminal 56, and a downward direction in FIG. 5 is referred to as a downward direction of the terminal 56.

The terminal 56 has a flat-shaped insertion part 56a. The insertion part 56a is configured to have a metallic terminal fitting electrically connected and conductive by inserting a terminal (i.e., external connection terminal) of a male connector (i.e., mating connector) into the insertion part 56a. A stopper 56b is formed at a side edge part in the vicinity of a lower end part of the insertion part 56a, and a press-fit part 56c is formed below the stopper 56b (i.e., lower end part of the insertion part 56a).

The stopper 56b is formed to project laterally from an end face of the side edge part of the insertion part 56a, and a shape of the stopper 56b is configured such that the lower surface is a vertical plane orthogonal to the end face of the side edge part of the insertion part 56a. Further, the press-fit part 56c has plural small projections formed to project laterally from the end face of the side edge part of the insertion part 56a.

Figure 6A:
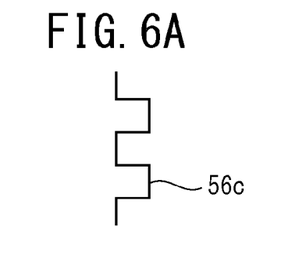
FIG. 6A and FIG. 6B are diagrams illustrating examples of press-fit parts.
Figure 6B:
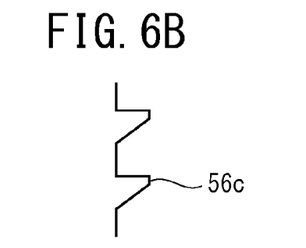

The projection of the press-fit part 56c may have a rectangular and uneven shape in which upper and lower surfaces are vertical planes orthogonal to the end face of the side edge part of the insertion part 56a as illustrated in FIG. 6A, or may have so-called saw tooth-shaped unevenness in which the lower surface is a tapered surface which rises upward and laterally (i.e., rightward direction in FIG. 6B) and in which the upper surface is a vertical plane orthogonal to the end face of the side edge part of the insertion part 56a as illustrated in FIG. 6B.

Moreover, two lead parts (i.e., pins) 56d are connected in parallel in a width direction of the insertion part 56a to the lower surface of the insertion part 56a. The pins 56d are inserted into holes 40b formed in the control circuit substrate 40 illustrated in FIG. 3 in a state where the terminal 56 is accommodated in the connector housing 55, are soldered by point dipping, and are coated to be dust-proof.

Tip parts (i.e., lower end parts) of the pins 56d are disposed to be in parallel with a plane of the insertion part 56a and to offset the plane of the insertion part 56a. Specifically, the pins 56d are bent in a substantially thickness direction of the insertion part 56a by a bent part 56e at positions separated downward by a predetermined distance from the lower surface of the insertion part 56a. Further, the tip parts (i.e., lower end parts) of the pins 56d are bent in a direction parallel with the plane of the insertion part 56a by bent parts 56f at positions separated downward by a predetermined distance from the bent part 56e. In other words, the pins 56d have a substantially letter Z shape in a side view. An angle of each of the bent parts 56e and 56f is an obtuse angle.

Figure 7:
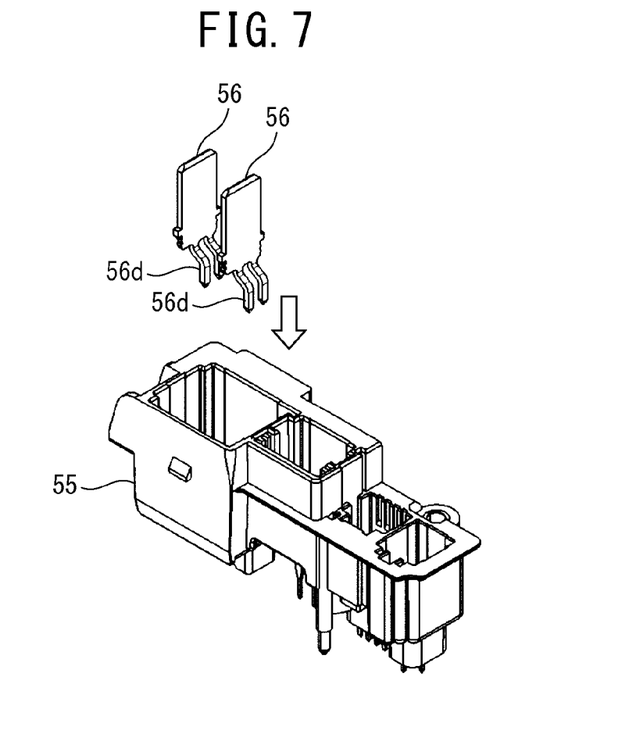
FIG. 7 is a diagram illustrating a connector terminal insertion method.

As illustrated in FIG. 7, the terminal 56 is inserted into the power supply connector unit 51 of the connector housing 55 from a pin 56d side and held therein. Herein, the two terminals 56 are located in parallel to each other in the thickness direction of the insertion part 56a and are accommodated in the power supply connector unit 51 of the connector housing 55. In this case, the terminals 56 are located in such a manner that the offset direction of the pin 56d is set on center side of the connector housing 55 with respect to a fixed point of the insertion part 56a of the pin 56d.

Figure 8:
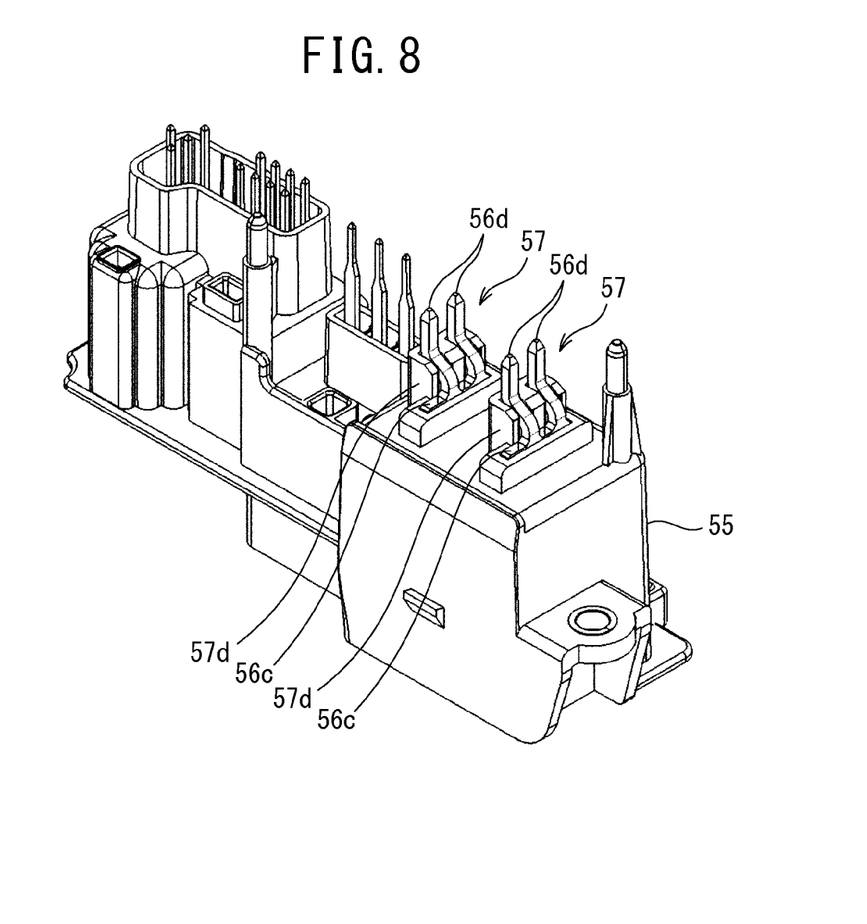
FIG. 8 is a diagram of the connector viewed from a bottom surface side.

FIG. 8 is a diagram of the connector 50 viewed from a bottom surface side of the connector housing 55 in a state where the terminal 56 is inserted into the connector housing 55.

As illustrated in FIG. 8, the connector housing 55 has two sets of two holes 57 through which at least the two pins 56d of the terminal 56 can respectively penetrate from tip sides of the two pins 56d. When the terminal 56 is accommodated, the pins 56d are in a state of respectively projecting from the holes 57 in a direction orthogonal to a bottom surface of the connector housing 55.

Figure 9:
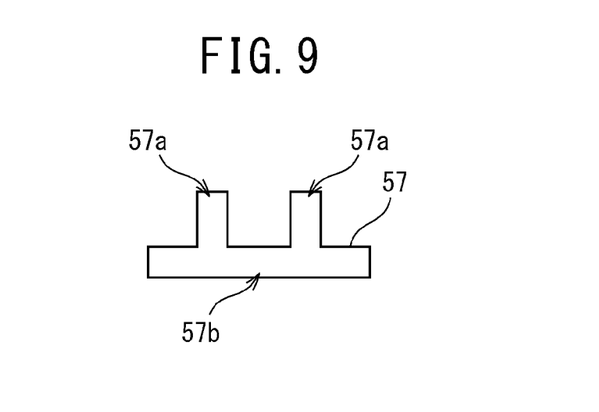
FIG. 9 is a diagram illustrating a shape of an opening part.

FIG. 9 is a plan diagram illustrating a shape of the hole 57. As illustrated in FIG. 9, the hole 57 is a hole having a wooden clog shape in a plan view, and is configured to have two opening parts (i.e., through-holes) 57a through which the pins 56d penetrate and an opening part (i.e., press-fit hole) 57b into which the press-fit part 56c is press-fit. The opening part 57a has the same size as that of an external shape of the pin 56d when the terminal 56 is viewed from a press-fit direction, that is, the opening part 57a has a minimum size through which the pin 56d can penetrate from the tip side of the pin 56d. In addition, the opening part 57b has a size slightly smaller than that of an external shape of the press-fit part 56c when the terminal 56 is viewed from the press-fit direction.

Further, a guide wall 57d is formed on the bottom surface of the connector housing 55 along an outer circumference of the opening part 57a on the side where the pin 56d projects when the terminal 56 is accommodated (i.e., the side opposite to the insertion port side of the connector 50). The guide wall 57d is formed in three directions that surround each of the pins 56d (i.e., the left and right directions and the offset direction of the pin 56d), and has a height at least equal to a height from the outer circumference of the hole 57 to the bent parts 56f of the pin 56d when the terminal 56 is accommodated.

Figure 10A:
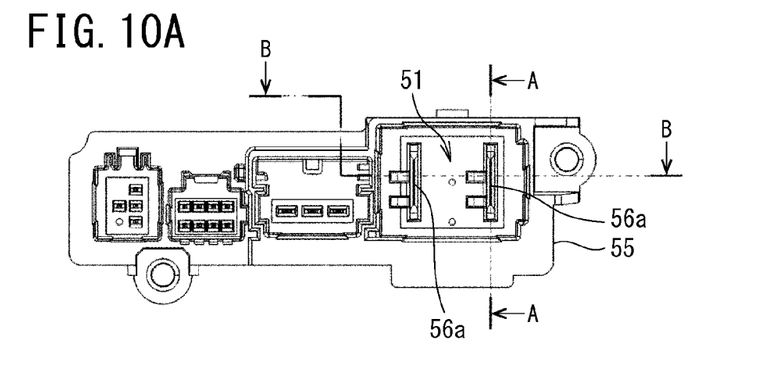
FIG. 10A to FIG. 10C are cross-sectional diagrams illustrating an insertion state of the connector terminal.
Figure 10B:
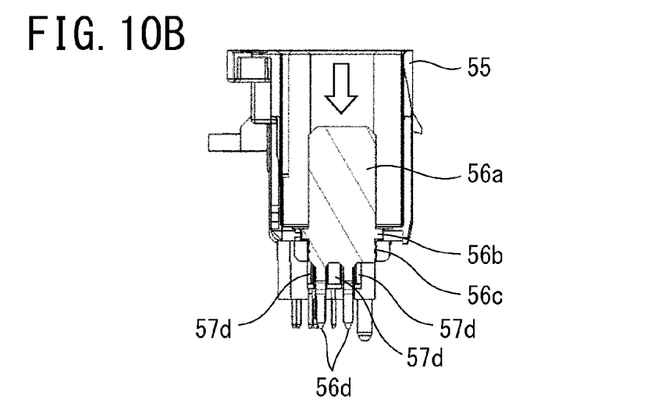
Figure 10C:
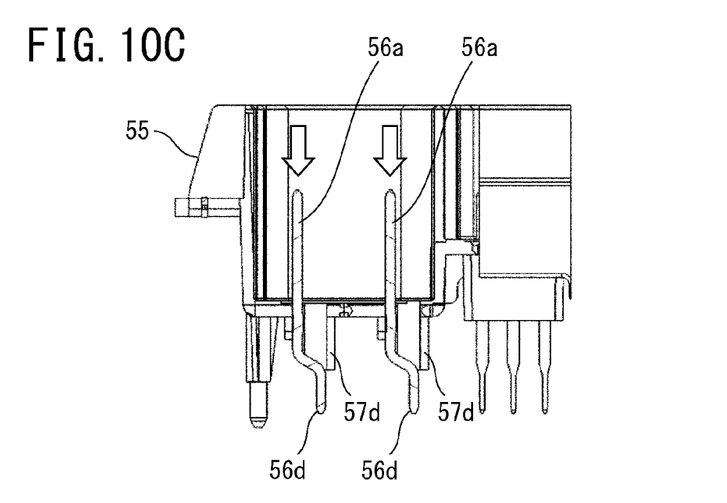

With such a configuration, the terminal 56 has an insertion state as illustrated in FIG. 10A to FIG. 10C when the terminal 56 is inserted into the power supply connector unit 51 of the connector housing 55 from the pin 56d side. In FIG. 10 A to FIG. 10C, FIG. 10A is a diagram of the connector 50 viewed from the insertion port side, FIG. 10B is a cross-sectional view taken along line A-A of FIG. 10A, and FIG. 10C is a cross-sectional view taken along line B-B of FIG. 10A.

In a state where the terminal 56 is inserted into the hole 57 formed on the bottom surface of the connector housing 55, the pin 56d of the terminal 56 is in a state of penetrating through the opening part 57a of the hole 57 and the press-fit part 56c of the terminal 56 is in a state of being tightly fit and press-fit into the opening part 57b of the hole 57. In this case, the projection of the press-fit part 56c is inserted into an inner wall of the opening part 57b, and the connector housing 55 holds the terminal 56 with a sufficient holding force.

The opening part 57b has a size through which the stopper 56b cannot penetrate, and thus the terminal 56 is press-fit until the stopper 56b abuts against a bottom surface on the rear side of the connector housing 55. In this manner, positioning of the terminal 56 is performed in the press-fit direction. In this situation, a lower end face of the press-fit part 56c slightly projects from the opening part 57b.

In this state, the guide wall 57d is located with a minimum clearance on both left and right sides interposing the pin 56d as illustrated in FIG. 10B. Further, as illustrated in FIG. 10C, the guide wall 57d is located with a minimum clearance from a tip part of the pin 56d on the offset side of the pin 56d with respect to the plane of the insertion part 56a.

In other words, the pin 56d and the guide wall 57d cover the opening part 57a. In this manner, the opening part 57a is closed, and it is possible to prevent entering of foreign matter from the connector insertion port side toward a substrate side.

In this manner, it is possible to press-fit the terminal 56 in an insertion direction of the mating connector from the pin 56d side when the opening part 57a through which the pin 56d can penetrate is disposed in the connector housing 55. Accordingly, it is possible to outsert the terminal 56 on which the bending process is performed to the connector housing 55, and it is possible to assemble the connector 50 in a relatively simple manner.

Examples of methods for assembling the terminal that has the pin having the bent part to the connector housing include the insert molding by which the terminal is integrally molded at the time of molding the connector housing. However, in the method of performing the insert molding, the molding process is complicated and costly.

Therefore, assembling with the use of the outsert molding is performed to avoid an increase in the costs, but in a case where the bending process is performed on the pin subsequent to the outsert molding, cracks may be generated due to a load imposed on a resin part (i.e., connector housing) and positional accuracy of the terminal may be deteriorated. Accordingly, it is preferable that the bending process be performed on the pin in advance and then the outsert molding be performed on the terminal.

In a case where the bending process is performed on the pin before the outsert molding, however, an opening part which is large enough for the pin on which the bending process is performed to penetrate through has to be provided to insert the terminal into the connector housing in the normal connector insertion direction. Such a large opening part easily permits entering of foreign matter from the connector housing side toward the substrate through the opening part.

By press-fitting the terminal into the connector housing from the substrate side in opposite to the normal connector insertion direction, assembling of the terminal can be considered without making the opening part large. However, in this case, terminal disconnection may be caused by a load from a connector insertion side at the time of insertion of the mating connector or the like, and a load applied on the substrate may be increased.

In contrast, as described above, in this embodiment, the opening part 57a through which the pin 56d can penetrate is provided in the connector housing 55, and thus it is possible to insert the terminal 56 in the connector insertion direction from the pin 56d side. Accordingly, it is possible to prevent the terminal disconnection caused by the load from the connector insertion side and to prevent the load applied on the substrate.

Further, the bending process is performed on the pin 56d, and thus it is possible to reduce a stress on the substrate and a soldering part caused by thermal contraction or thermal expansion. Herein, the bent parts 56e and 56f are arranged in such a manner that the pin 56d is bent in two steps in a direction toward the center from an outer side of the connector housing 55 in a state where the terminal 56 is held by the connector housing 55, and thus it is possible to allow a tip position of the pin 56d to be closer to the adjacent communication connector unit 52, and it is possible to allow an attached part of the connector 50 to be attached to the substrate to be compact.

Moreover, in this structure, the stopper 56b is disposed in the terminal 56 and the terminal 56 is inserted from the connector insertion direction to abut against the stopper 56b, and thus it is possible to position the terminal 56 in the press-fit direction by use of the stopper 56b, and in addition, it is possible to prevent the terminal 56 from transmitting the load directly toward the substrate when an insertion weight to the connector or a pushing force (i.e., external force) is given to the terminal 56. Herein, the stopper 56b is arranged at the side edge part of the flat-shaped insertion part 56a, and thus the buckling hardly occurs.

Furthermore, since the press-fit part 56c that has a small projection is disposed in the terminal 56 and is press-fit into and fixed to the connector housing 55, it is possible to assemble the connector 50 in a simple manner. Additionally, it is possible to allow the projection to be inserted into the inner wall of the opening part 57b so as to achieve a sufficient holding force to suppress the terminal disconnection. In particular, it is possible to achieve a structure in which the terminal 56 is easily press-fit but hardly disconnected, by forming the press-fit part 56c into the shape illustrated in FIG. 6B.

Further, since the connector housing 55 is subjected to the outsert molding after the bending process is performed on the pin 56d in advance, thereby eliminating the necessity of additional facilities for the bending process and improving the processing accuracy, as compared to a case where the bending process is performed after the outsert molding. Additionally, by performing the bending process in advance, it is possible to reduce the stress on the resin part generated during the bending process after the outsert molding, and it is possible to prevent the cracks from being generated in the connector 50. Furthermore, it is possible to regulate bending dimensions and linear dimensions in advance and it is possible to determine a press-fit depth of the terminal 56 with the stopper 56b, and thus improving positional accuracy at a pin tip.

Further, since the guide wall 57d having a clearance with the pin 56d is set to the minimum is formed along the outer circumference of the opening part 57a, it is possible to obtain a closed structure that prevents entering of the foreign matter from the connector housing side toward the substrate. Further, it is possible to protect the pin 56d by use of the guide wall 57d, and thus it is possible to make a reinforcement with respect to a bending load input of the pin 56d and it is possible to prevent the pin 56d from falling.

In this manner, it is possible to reduce the costs by using the simple assembly method, reduce the load applied on the connector housing 55, and realize the prevention of the terminal disconnection at the time of the connector insertion. Furthermore, it is possible to improve the positional accuracy between the substrate 40 and the pin 56d of the terminal 56 and to realize the protection of the terminal 56 from the external force, and thus it is possible to perform the assembly of the connector 50 in a simple manner. Further, since it is possible to prevent entering of the foreign matter from the connector 50 side through the connector and finally into the ECU, it is possible to improve reliability of the ECU.

Heretofore, the embodiment of the present invention has been described. However, the present invention is not limited thereto, but it is possible to perform various modifications and improvements thereon.

For example, in the above-described embodiment, the hole 57 formed in the connector housing 55 has the wooden clog shape as illustrated in FIG. 9. However, the opening part 57b into which the press-fit part 56c of the terminal 56 is press-fit may be closed.

Further, in the above-described embodiment, the present invention has been applied to the terminal 56 of the power supply connector unit 51. However, the present invention can be applied to any connector in which a terminal having a bent pin is inserted and press-fit to assemble a connector housing.

INDUSTRIAL APPLICABILITY

The connector of the present invention is useful in that it is possible to simplify the assembly of the connector terminal into the connector housing, protect the lead part projecting from the connector housing, and realize the prevention of entering of the foreign matter from the connector side into the ECU.

REFERENCE SIGNS LIST

1 Steering wheel
2 Column shaft
3 Reduction gear
4A, 4B Universal joint

5 Rack and pinion mechanism
6 Tight rod
7 Torque sensor
8 Electric motor
9 Vehicle speed sensor
10 Controller
11 Control computing device
12 Gate drive circuit
13 Motor drive unit
14 Breaker device for emergency stop
15 Current detecting circuit
16 Rotation sensor
17 Rotor position detecting circuit
18 IGN voltage monitoring unit
19 Power supply circuit unit
20 Case
21 Semiconductor module mounting part
21a Screw hole
22 Power/signal connector mounting part
23 Three-phase output connector mounting part
23a Screw hole
24 Attachment post
24a Screw hole
30 Semiconductor module
31 Substrate
31a Through-hole
38 Attachment screw
39 Heat-dissipating sheet
40 Control circuit substrate
40a Through-hole
41 Attachment screw
50 Power and signal connector
50a Attachment screw
51 Power supply connector unit
52 Communication connector unit
53 Torque signal connector unit
54 Resolver signal connector unit
55 Connector housing
56 Power supply connector terminal (terminal)
56a Insertion part
56b Stopper
56c Press-fit part
56d Pin (lead part)
56e, 56f Bent part
57 Hole
57a Opening part (through-hole)
57b Opening part (press-fit hole)
57d Guide wall
60 Three-phase output connector
60a Through-hole
61 Attachment screw
70 Cover
81 Power supply line
82 Ground line
91a a-Phase output line
91b b-Phase output line
91c c-Phase output line
G Gate electrode (electrode)
S Source electrode (electrode)

The invention claimed is:

1. A connector comprising:
a connector terminal provided with an insertion part that includes a terminal metal fitting to be electrically connected with an external connection terminal, and a connector terminal with one end fixed to an end part of the insertion part and the other end connected to a substrate, the connector terminal including a lead part which has a bent shape; and
a connector housing holding the connector terminal,
wherein the connector housing includes a through-hole that has a minimum size by which the lead part can penetrate through the through-hole from the other end side of the lead part, and a guide wall formed along an outer circumference of the through-hole and projects in a direction in which the lead part projects from the connector housing, and
wherein the guide wall has a height at least equal to a height from the outer circumference of the through-hole to a bent point of the lead part in a state where the connector housing holds the connector terminal.

2. The connector according to claim 1,
wherein the connector housing includes a press-fit hole into which the connector terminal is press-fit, and
wherein the insertion part includes a press-fit part to be press-fit into the press-fit hole at an end part on a fixed side of the lead part.

3. The connector according to claim 2, wherein the press-fit part includes a small projection that projects laterally from a side edge part of the insertion part.

4. The connector according to claim 2, wherein the insertion part includes a stopper disposed on a side opposite to a fixed point of the lead part to be adjacent to the press-fit part and projects laterally from the outer circumference of the press-fit hole.

5. The connector according to claim 1, wherein the terminal metal fitting is a flat-shaped power supply connection terminal.

6. The connector according to claim 1, wherein the lead part has two bent points, in which a tip part of the lead part conforms to an insertion direction of the connector terminal toward the connector housing in a state of holding by the connector housing, and the tip part of the lead part has a substantially letter Z shape extending to an offset position on a center side of the connector housing with respect to the fixed point to the insertion part.

* * * * *